US012657850B2

(12) United States Patent
Izumi

(10) Patent No.: US 12,657,850 B2
(45) Date of Patent: Jun. 16, 2026

(54) INFORMATION PROCESSING APPARATUS, INFORMATION PROCESSING METHOD, AND PROGRAM

(71) Applicant: Sony Group Corporation, Tokyo (JP)

(72) Inventor: Nobuaki Izumi, Kanagawa (JP)

(73) Assignee: SONY GROUP CORPORATION, Tokyo (JP)

( * ) Notice: Subject to any disclaimer, the term of this patent is extended or adjusted under 35 U.S.C. 154(b) by 168 days.

(21) Appl. No.: 18/282,144

(22) PCT Filed: Jan. 13, 2022

(86) PCT No.: PCT/JP2022/000896
§ 371 (c)(1),
(2) Date: Sep. 14, 2023

(87) PCT Pub. No.: WO2022/209129
PCT Pub. Date: Oct. 6, 2022

(65) Prior Publication Data
US 2024/0153226 A1 May 9, 2024

(30) Foreign Application Priority Data
Mar. 31, 2021 (JP) ................................. 2021-059700

(51) Int. Cl.
*G06T 19/20* (2011.01)
(52) U.S. Cl.
CPC ........ *G06T 19/20* (2013.01); *G06T 2219/024* (2013.01); *G06T 2219/2004* (2013.01)
(58) Field of Classification Search
CPC ............... G06T 19/20; G06T 2219/024; G06T 2219/2004
See application file for complete search history.

(56) References Cited

U.S. PATENT DOCUMENTS

| 10,796,489 B1 * | 10/2020 | Cordes | ................... A63F 13/213 |
| 11,100,695 B1 * | 8/2021 | O'Hagan | ................ G06T 13/40 |

(Continued)

FOREIGN PATENT DOCUMENTS

| JP | 2000-299684 A | 10/2000 |
| JP | 2001160154 A * | 6/2001 |

(Continued)

OTHER PUBLICATIONS

Kawaguchi, Idols turn into 3D data with 84 cameras! Exclusive release behind the scenes of Delusion Carry MV, retrieved from https://kai-you.net/article/38518 (KAI-YOU.net), Feb. 14, 2017, pp. 1-23 (see the translation of International Search Report below).

(Continued)

*Primary Examiner* — Kenneth B Lee, Jr.
(74) *Attorney, Agent, or Firm* — Paratus Law Group, PLLC

(57) ABSTRACT

An information processing apparatus, an information processing method, and a program are provided to reduce a processing load while enhancing the level of entertainment. The information processing apparatus includes a control section configured to perform control to distribute, to at least one viewer terminal, information regarding a virtual space in which a virtual object of a performer and a virtual object of a viewer are arranged. Of the virtual objects of all viewers arranged in the virtual space, for a virtual object of a viewer at a distribution destination of another information processing apparatus, the control section uses information received from the other information processing apparatus, as motion information regarding the virtual object of the viewer at the distribution destination of the other information processing apparatus, the received information being smaller in amount than the motion information to be used for the virtual object (Continued)

of the viewer at a distribution destination of the control section.

14 Claims, 9 Drawing Sheets

(56) References Cited

U.S. PATENT DOCUMENTS

| | | | | |
|---|---|---|---|---|
| 11,238,619 | B1 * | 2/2022 | Perez, III | ............ G06F 3/04847 |
| 2018/0342106 | A1 * | 11/2018 | Rosado | .................. A63F 13/35 |
| 2021/0342886 | A1 * | 11/2021 | O'Hanlon | ............ G06V 40/172 |

FOREIGN PATENT DOCUMENTS

| | | | | |
|---|---|---|---|---|
| JP | 2012525622 | A | | 10/2012 |
| JP | 2018094326 | A | * | 6/2018 |
| JP | 2019-126101 | A | | 7/2019 |
| JP | 2020534952 | A | | 12/2020 |

OTHER PUBLICATIONS

Mar. 1, 2022, Translation of International Search Report issued for related PCT Application No. PCT/JP2022/000896.

* cited by examiner

FIG.1

F I G . 3
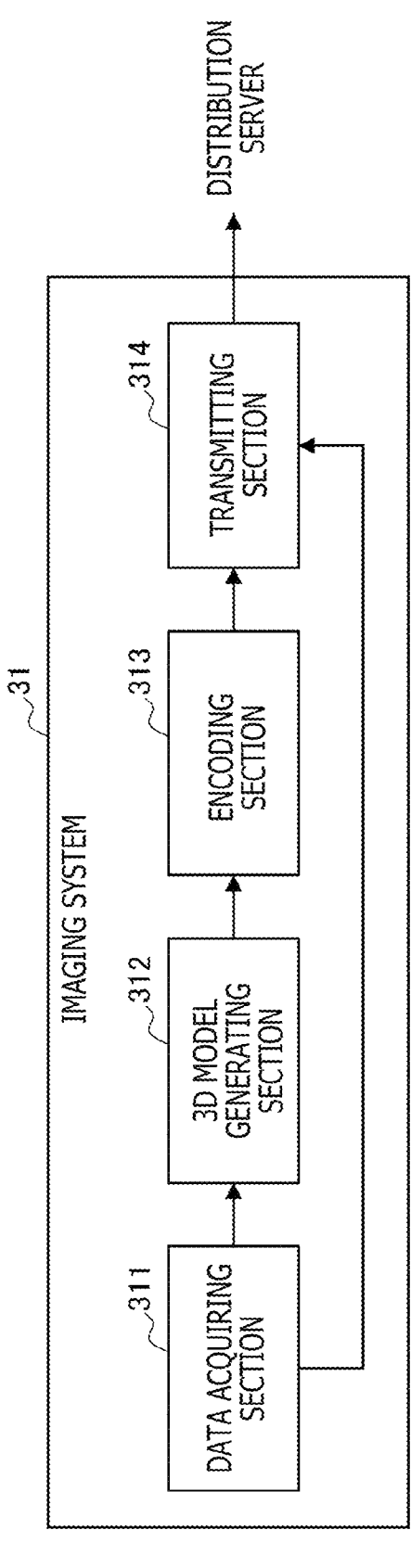

FIG.5

F I G . 7
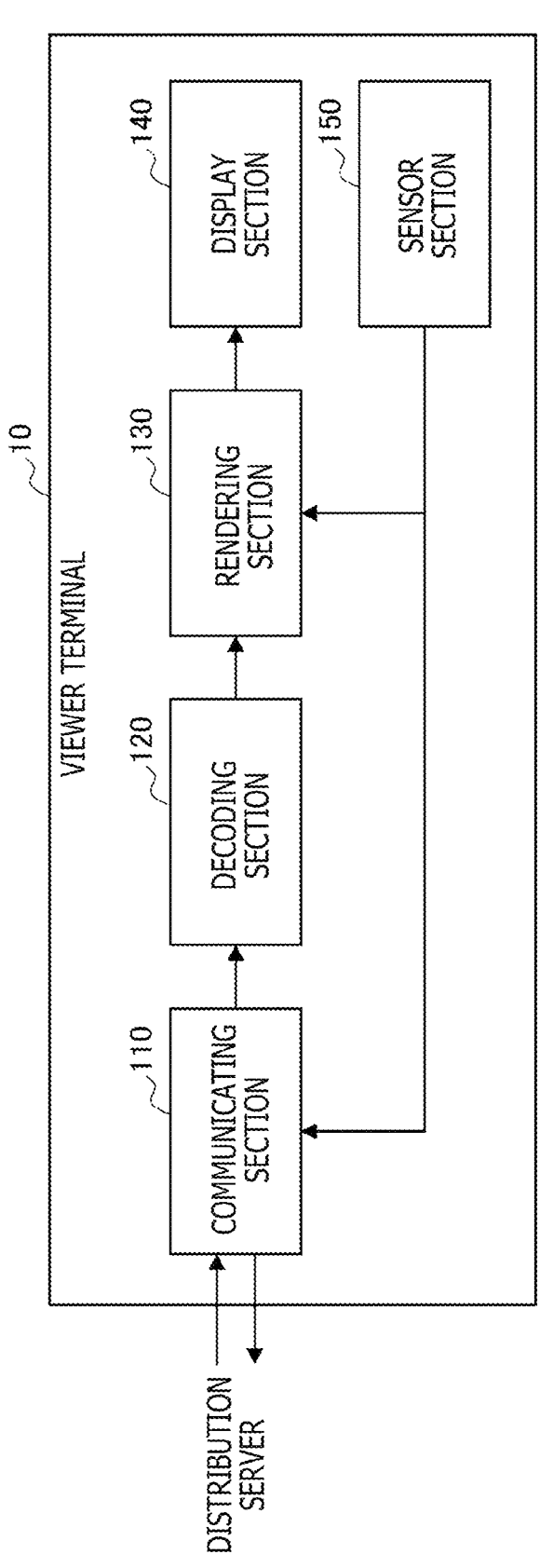

F I G . 8

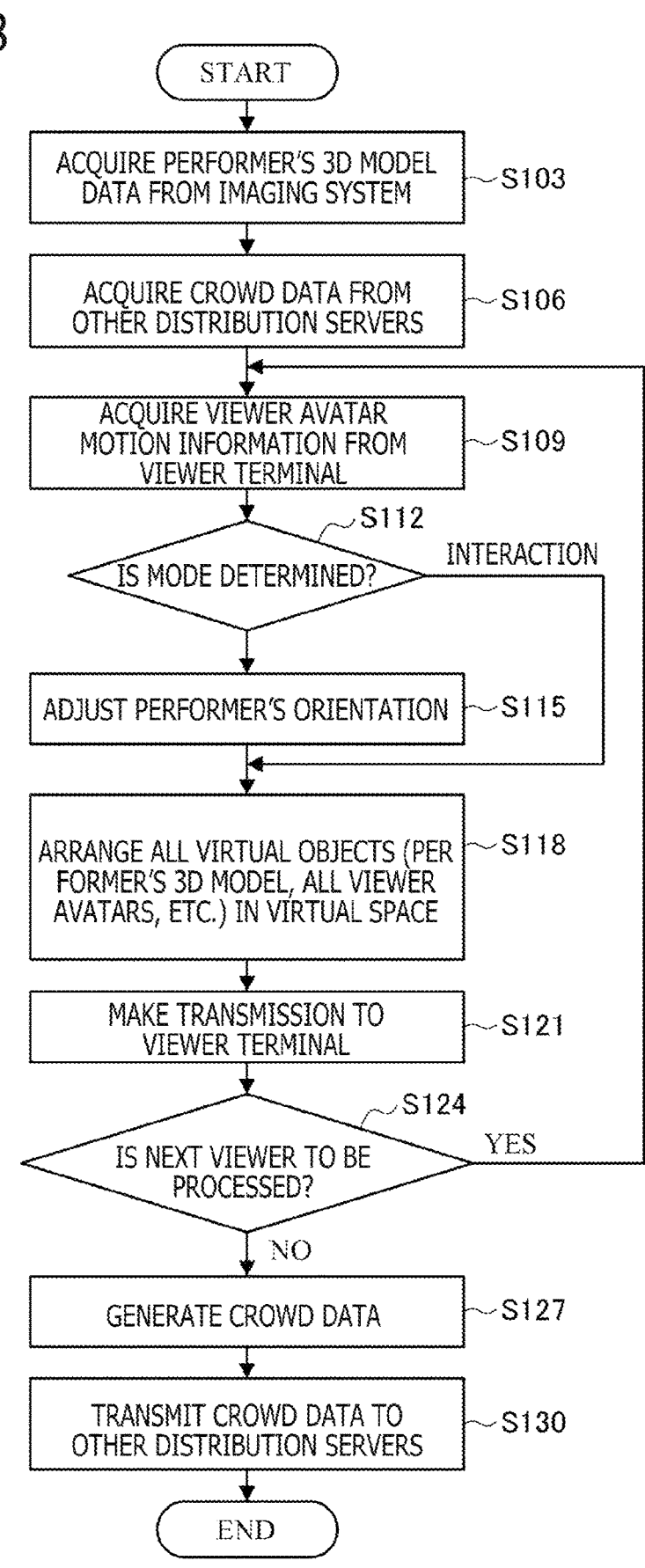

START

ACQUIRE PERFORMER'S 3D MODEL
DATA FROM IMAGING SYSTEM — S103

ACQUIRE CROWD DATA FROM
OTHER DISTRIBUTION SERVERS — S106

ACQUIRE VIEWER AVATAR
MOTION INFORMATION FROM
VIEWER TERMINAL — S109

IS MODE DETERMINED? — S112          INTERACTION

ADJUST PERFORMER'S ORIENTATION — S115

ARRANGE ALL VIRTUAL OBJECTS (PER
FORMER'S 3D MODEL, ALL VIEWER
AVATARS, ETC.) IN VIRTUAL SPACE — S118

MAKE TRANSMISSION TO
VIEWER TERMINAL — S121

IS NEXT VIEWER TO BE
PROCESSED? — S124          YES

NO

GENERATE CROWD DATA — S127

TRANSMIT CROWD DATA TO
OTHER DISTRIBUTION SERVERS — S130

END

INFORMATION PROCESSING APPARATUS, INFORMATION PROCESSING METHOD, AND PROGRAM

CROSS REFERENCE TO PRIOR APPLICATION

This application is a National Stage Patent Application of PCT International Patent Application No. PCT/JP2022/000896 (filed on Jan. 13, 2022) under 35 U.S.C. § 371, which claims priority to Japanese Patent Application No. 2021-059700 (filed on Mar. 31, 2021), which are all hereby incorporated by reference in their entirety.

TECHNICAL FIELD

The present disclosure relates to an information processing apparatus, an information processing method, and a program.

BACKGROUND ART

Recent years have seen the widespread use of a VR (Virtual Reality) technology that enables a user to view, from desired viewpoints, the inside of a virtual space in which a 3D model is arranged. As a terminal used by a user for viewing videos in such a virtual space (VR space), the user may adopt an HMD (Head Mounted Display) structured to cover the user's entire field of view in order to enhance the sense of immersion in the virtual space. Further, a character object (called the avatar) moving as the alter ego of the user may also be arranged in the virtual space. Moreover, with not only the avatar of the user but also the avatars of other users displayed in the virtual space, the user can have an experience that feels like sharing a venue with other people.

In addition, PTL 1 cited below discloses a technology that detects, from user-worn HMDs, the reactions of the users viewing video content distributed in real time and transmits the information thus detected (motion information regarding the users which is based on output from acceleration sensors and angular velocity sensors) to the location where the content is being imaged, to present the detected information in a real venue.

CITATION LIST

Patent Literature

[PTL 1]
Japanese Patent Laid-open No. 2019-126101

SUMMARY

Technical Problem

However, there has been the problem of a heavy processing load at the time of causing the motions of many users (viewers) to be reflected in the virtual space.

The present disclosure thus proposes an information processing apparatus, an information processing method, and a program for reducing a processing load while enhancing the level of entertainment.

Solution to Problem

According to the present disclosure, there is proposed an information processing apparatus including a control section configured to perform control to distribute, to at least one viewer terminal, information regarding a virtual space in which a virtual object of a performer and a virtual object of a viewer are arranged. Of the virtual objects of all viewers arranged in the virtual space, for a virtual object of a viewer at a distribution destination of another information processing apparatus, the control section uses information received from the other information processing apparatus, as motion information regarding the virtual object of the viewer at the distribution destination of the other information processing apparatus, the received information being smaller in amount than the motion information to be used for the virtual object of the viewer at a distribution destination of the control section.

According to the present disclosure, there is also proposed an information processing method including, by a processor, performing control to distribute, to at least one viewer terminal, information regarding a virtual space in which a virtual object of a performer and a virtual object of a viewer are arranged, and, of the virtual objects of all viewers arranged in the virtual space, for a virtual object of a viewer at a distribution destination of another information processing apparatus, using information received from the other information processing apparatus, as motion information regarding the virtual object of the viewer at the distribution destination of the other information processing apparatus, the received information being smaller in amount than the motion information to be used for the virtual object of the viewer at a distribution destination of the distribution control.

According to the present disclosure, there is further proposed a program for causing a computer to function as a control section configured to perform control to distribute, to at least one viewer terminal, information regarding a virtual space in which a virtual object of a performer and a virtual object of a viewer are arranged. Of the virtual objects of all viewers arranged in the virtual space, for a virtual object of a viewer at a distribution destination of another information processing apparatus, the control section uses information received from the other information processing apparatus, as motion information regarding the virtual object of the viewer at the distribution destination of the other information processing apparatus, the received information being smaller in amount than the motion information to be used for the virtual object of the viewer at a distribution destination of the control section.

BRIEF DESCRIPTION OF DRAWINGS

FIG. 1 is a diagram explaining an overview of an information processing system as one embodiment of the present disclosure.

FIG. 3 is a block diagram depicting an exemplary configuration of an imaging system according to the present embodiment.

FIG. 5 is a diagram depicting an exemplary arrangement of virtual objects in a virtual space according to the present embodiment.

FIG. 7 is a block diagram depicting an exemplary configuration of a viewer terminal according to the present embodiment.

FIG. 8 is a flowchart indicating an exemplary flow of operational processing performed by the distribution server according to the present embodiment.

DESCRIPTION OF EMBODIMENT

Figure 2:
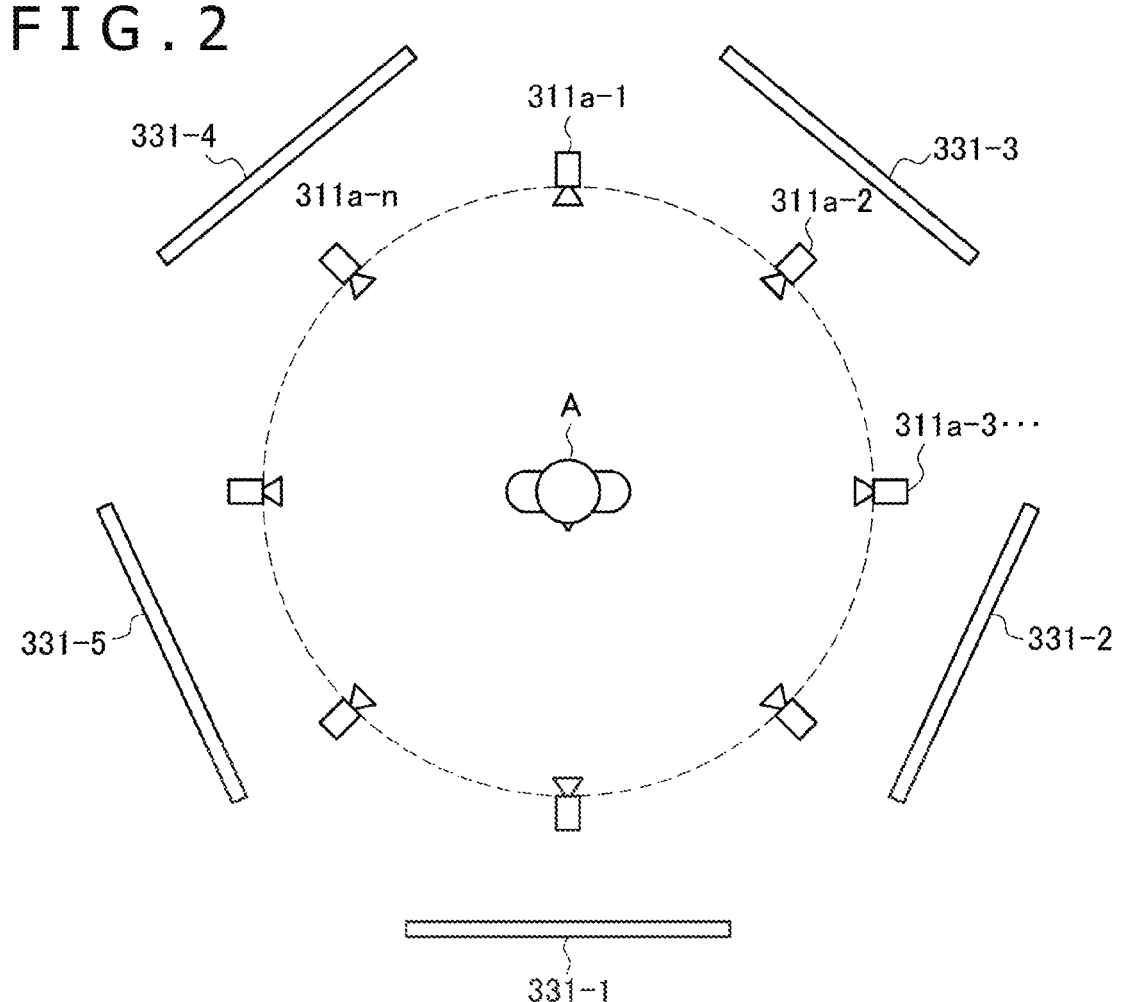
FIG. 2 is a diagram explaining an arrangement of cameras and display units around a performer according to the present embodiment.

A preferred embodiment of the present disclosure is described below in detail with reference to the accompanying drawings. It is to be noted that, throughout the ensuing description and the drawings, the constituent elements having substantially identical functions and configurations are represented by the same reference signs, and their redundant explanations are omitted.

In addition, the description will be made in the following order.

1. Overview of information processing system according to one embodiment of present disclosure
2. Exemplary configurations
   2-1. Imaging system 31
   2-2. Distribution servers 20
   2-3. Viewer terminals 10
3. Operational processing
4. Hardware configuration
5. Supplementary notes

1. OVERVIEW OF INFORMATION PROCESSING SYSTEM ACCORDING TO ONE EMBODIMENT OF PRESENT DISCLOSURE

Figure 1:
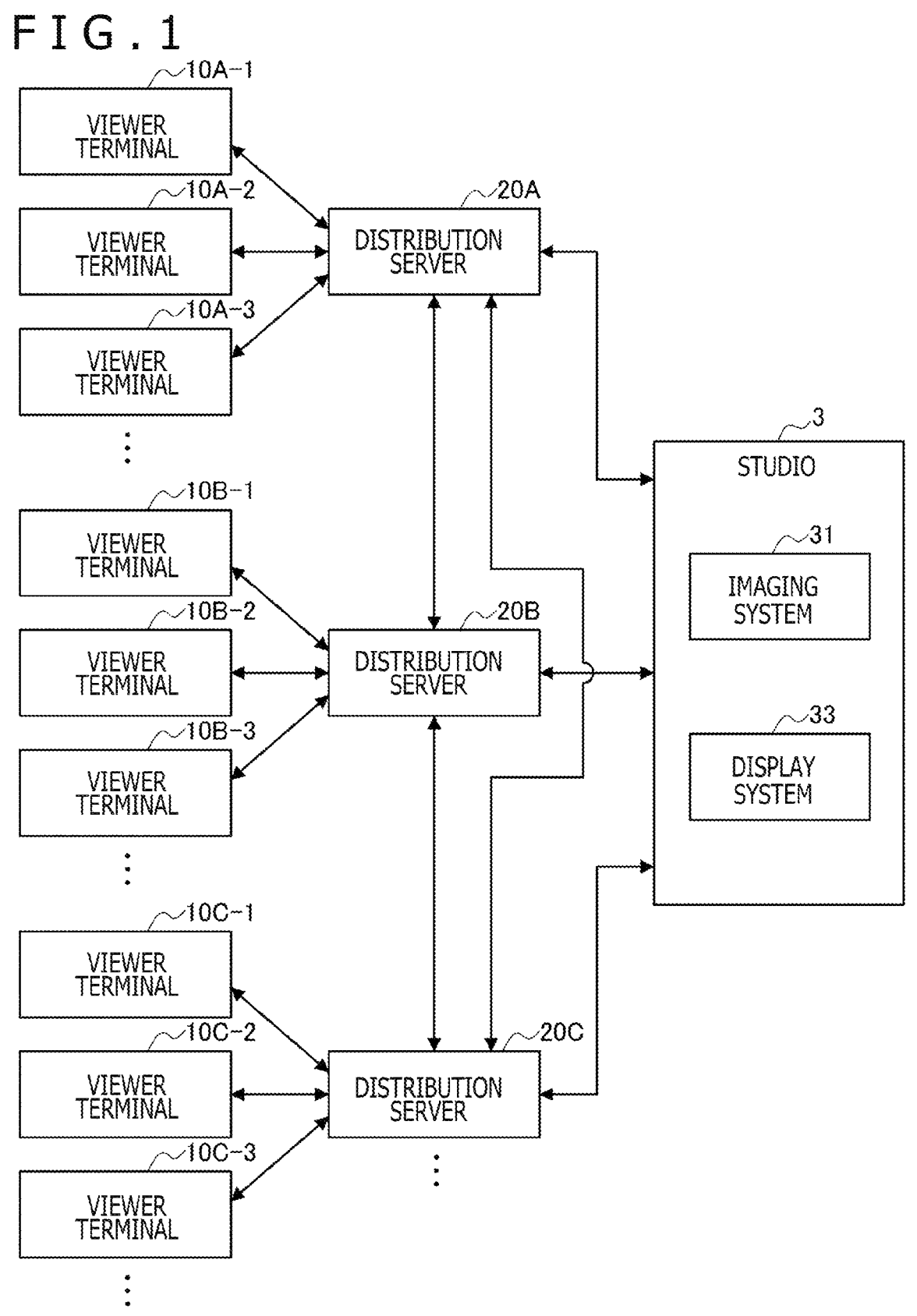

FIG. 1 is a diagram explaining an overview of an information processing system according to one embodiment of the present disclosure. As depicted in FIG. 1, the information processing system according to the present embodiment includes multiple distribution servers 20 (20A to 20C, etc.), an imaging system 31 in a studio 3, the imaging system 31 acquiring distribution videos, viewer terminals 10 to which videos are distributed from the distribution servers 20, and a display system 33 in the studio 3, the display system 33 presenting the state of the viewers.

The distribution servers 20 have the function of providing a virtual space. In the virtual space, concerts, lectures, theaters, festivals, and other various events may be held. For example, the present embodiment assumes the case where a performer holds a concert in a virtual space and where numerous viewers view the concert in that virtual space.

In the virtual space provided by the distribution servers 20, viewer avatars reflecting the motions of viewers are arranged. The viewer avatar is an exemplary virtual object of the viewer. More specifically, the viewer avatar may be a character 3D model reflecting the motion of the viewer. Viewer motion information is transmitted from the viewer terminals 10 to the distribution servers 20 in real time. Further, each viewer can have an experience that feels like sharing a venue with other people, when the avatars in addition to his or her own avatar are displayed in the virtual space.

The imaging system 31 provides real-time videos of the performer to the distribution servers 20. The video of the performer acquired by the imaging system 31 and provided to the distribution servers 20 may be a 3D live-action avatar (referred to as a "live-action 3D model" in this description)

generated by use of a technology that turns the live-action video of the performer into 3D CG (e.g., Volumetric Capture technology). This allows each viewer to view a more realistic performer. It is to be noted that, although the live-action 3D model is cited here as an exemplary virtual object of the performer, this is not limitative of the present embodiment. Alternatively, a 3D CG character reflecting the motion of the performer may be used as the virtual object of the performer.

The display system 33 displays, in real time, a video of an entire concert venue in the virtual space as well as a video of the viewers as seen from the viewpoint of the performer (i.e., video of audience seats in which viewer avatars are arranged) in the virtual space, thereby providing the performer with the reactions of the viewers. It is to be noted that, although FIG. 1 depicts a system configuration that includes the display system 33, this is not limitative of the present embodiment. Alternatively, there may be a configuration that does not include the display system 33.

Summary of Problems

Here, as described above, there occurs the problem of a heavy processing load in the case where the motions of numerous viewers are caused to be reflected in the virtual space. In the case where the state of the many viewers is to be rendered in the virtual space, it is necessary to perform processing proportionate to the number of the viewers involved. It has been difficult for viewers in a number exceeding the processing capacity of the servers to share the virtual space. At present, for example, there are cases where a server with its limited processing capacity can handle only up to approximately 100 viewers. It is therefore difficult to provide, in the virtual space, an experience in which tens of thousands of viewers feel like sharing the venue that could be provided in a real concert venue.

In view of this, in the embodiment of the present disclosure, multiple distribution servers 20 (20A to 20C, etc.) are coordinated to arrange, in a single virtual space, more people than those can be handled by one server and enable the sharing experience. That is, the embodiment can reduce the processing load stemming from getting the motions of numerous viewers reflected in the virtual space, while enhancing the level of entertainment by allowing more viewers to share the virtual space.

In the example in FIG. 1, first, each distribution server 20 is communicably connected with viewer terminals 10 that are not so many as to overwhelm the processing capacity of the server. In the virtual space, each distribution server 20 allows the viewer avatars corresponding to the viewer terminals 10 communicably connected with the own distribution server 20 to be arranged close to one another, and causes the viewer avatars corresponding to the viewer terminals 10 communicably connected with any other distribution server 20 to be arranged at a distant location. When distantly located, those viewer avatars are seen from afar in a virtual space video from the viewpoints of the viewers (viewer avatar viewpoint), the video being displayed at the viewer terminals 10 communicably connected with the distribution server 20. Thus, the distantly-seen viewer avatars do not appear awkward even if the motions of the distantly-seen viewer avatars are not be reflected in minute detail. The distantly-seen viewer avatars are subjected as a crowd to simplified displayed control, which alleviates the processing load. The simplified display control may involve, for example, not controlling the facial expressions and hair and garment motions of each viewer avatar, but causing solely the overall body motion of the viewer avatars to be reflected. The overall body motion refers to changes in posture, for example. More specifically, the overall body motion may be given by bone information regarding 3D characters. Further, in a case where the crowd is represented by 100 viewer avatars, for example, the same body motion (e.g., changes in posture only) may be reflected in units of tens of viewer avatars.

The distribution server 20 generates crowd data for simplified display control as a crowd on the basis of the motion information regarding each viewer received from each of the numerous viewer terminals 10 communicably connected with this distribution server 20, the generated crowd data being transmitted to the other distribution servers 20. The crowd data is obtained by reducing the data amount of the motion information regarding each viewer received from each of numerous viewer terminals 10. For example, the motion information regarding each viewer received from each of the many viewer terminals 10 includes the facial expressions of the viewer avatars, information regarding hair motion of the viewer avatars, information regarding garment motion of the viewer avatars, and body motion (head orientation, posture change (e.g., bone information), hand and arm motion, finger motion, etc.) of the viewer avatars involved. When these motions are excluded except for "posture change" (e.g., bone information only), the data amount can be drastically reduced. In the present embodiment, the distribution server 20 thus delivers, to the other distribution servers 20, the "crowd data" constituted by the motion information reduced in data amount regarding the numerous viewer avatars.

More specifically, the distribution server 20A in FIG. 1, for example, generates the crowd data on the basis of the motion information regarding each viewer received from each of the viewer terminals 10A-1 to 10A-3, etc., and delivers the generated crowd data to the other distribution servers 20B, 20C, etc. The distribution server 20B causes the viewer avatars corresponding to the viewer terminals 10B-1 to 10B-3, etc., communicably connected with the distribution server 20B to reflect the minute motions (e.g., the above-described facial expressions, hair motion, garment motion, body motion, etc.) on the basis of the motion information regarding each viewer received from each of the viewer terminals 10B-1 to 10B-3, etc. Also, the distribution server 20B causes these viewer avatars to be arranged close to one another (e.g., in one of the audience areas established in a virtual-space concert venue). Further, the distribution server 20B causes the viewer terminals 10A-1 to 10A-3, etc., communicably connected with another distribution server 20A to be arranged in a location far (e.g., in another audience area) from the above-mentioned viewer avatars arranged close to one another. Then, on the basis of the crowd data received from the distribution server 20A, the distribution server 20B controls to display, in a simplified manner, the viewer avatars as a crowd corresponding to the viewer terminals 10A-1 to 10A-3, etc., communicably connected with the distribution server 20A (for example, only the posture change is reflected on the basis of the bone information). This enables processing with a reduced load. Since the viewer avatars corresponding to the viewer terminals 10A-1 to 10A-3, etc., are arranged at a distance, the distantly-seen viewer avatars do not reflect their individual minute motions under simplified display control but do not provoke awkward sensations in the virtual space video displayed from the viewpoint of each viewer at each of the viewer terminals 10B-1 to 10B-3, etc. Presumably, the viewers are unaware of the simplified control or are not bothered.

Explained above is an overview of the information processing system according to one embodiment of the present disclosure. It is to be noted that this system can reduce the processing load not only during concerts but also in cases where a large number of users share a virtual space, such as in games. The number of users may presumably amount to tens of thousands but is not limitative of the system. Incidentally, whereas no mention is made of audio with this system, the actual sound can be processed separately such that the voice of the performer can be transmitted to the viewers and the voice of each viewer can be transmitted to the performer as well as to the other viewers.

Next, specific configurations of some apparatuses included in the information processing system according to the present embodiment are described below with reference to the accompanying drawings.

2. EXEMPLARY CONFIGURATIONS

<2-1. Imaging System 31>

Explained first with reference to FIGS. 2 and 3 is the imaging system 31 for acquiring information regarding the performer.

FIG. 2 is a diagram explaining an arrangement of cameras 311a and display units 331 around a performer according to the present embodiment. In the imaging system 31 of the present embodiment, as depicted in FIG. 2, as many as "n" cameras 311a (an example of a data acquiring section 311) arranged around a performer A (e.g., in a circular pattern) in the studio 3 acquire the information for generating a 3D mode of the performer A. Under control of the imaging system 31, the "n" cameras 311a (311a-1 to 311a-1n) capture images simultaneously, which allows the imaging system 31 to acquire multiple-viewpoint data.

In addition, multiple display units 331 (e.g., LED displays) may be arranged around the performer A. Each of the display units 331 displays the viewer avatars seen from the viewpoint of the performer's live-action 3D model in the virtual space.

It is to be noted that, although the "n" cameras 311a and the multiple display units 331 are arranged in a circular pattern in the example in FIG. 2, the arrangement may alternatively be a rectangle or some other shape. Further, the arrangement of the cameras 311a may be different in shape from the arrangement of the display units 331. Moreover, instead of being arranged in a single perimeter around the performer A, the cameras 311a and the display units 331 may be arranged in multiple columns above and below the performer A.

FIG. 3 is a block diagram depicting an exemplary configuration of the imaging system 31 according to the present embodiment. As depicted in FIG. 3, the imaging system 31 includes the data acquiring section 311, a 3D model generating section 312, an encoding section 313, and a transmitting section 314. The imaging system 31 may include multiple information processing apparatuses or may be a single information processing apparatus. Further, the 3D model generating section 312 and the encoding section 313 are presented as the function of a control section of the information processing apparatus implementing the imaging system 31. Moreover, the transmitting section 314 is presented as the function of a communication section of the information processing apparatus implementing the imaging system 31. In addition, the data acquiring section 311 is presented as the function of an input section of the information processing apparatus implementing the imaging system 31. For example, the information processing apparatus for implementing the imaging system 31 may be a PC (personal computer), a tablet terminal, a smartphone, or the like arranged in the same space as the performer A, or may be a server on a network.

(Data Acquiring Section 311)

The data acquiring section 311 acquires the information for generating the 3D model of the performer. As explained above with reference to FIG. 2, numerous (e.g., tens of) cameras 311a for acquiring video signals (of captured images) are presented as an example of the data acquiring section 311. Under control of the imaging system 31, the cameras 311a capture images of the performer simultaneously from various angles to acquire many captured images. The data acquiring section 311 integrates the numerous captured images into multiple-viewpoint data and outputs the data to the 3D model generating section 312 that generates the performer's 3D model. It is to be noted that the cameras 311a may include various devices for sensing depth information. In this case, the multiple-viewpoint data may include not only RGB signals but also depth signals or sensing signals (e.g., infrared signals) serving as a base for the depth signals.

(3D Model Generating Section 312)

The 3D model generating section 312 generates the performer's 3D model as the virtual object of the performer (i.e., performs modeling) on the basis of the data acquired by the data acquiring section 311. The method of 3D modeling is not limited to anything specific. For example, the Shape from Silhouette (SFS) method such as the Visual Hull method (visual volume intersection method), or the Multi-View Stereo (multiple viewpoint stereo) method (MVS method) may be adopted. Further, the data form of the 3D model may be any suitable expression form, such as Point Cloud, voxel, or mesh.

The present embodiment presents an exemplary case in which the 3D model is expressed by a combination of mesh shape data and surface texture information. For example, the present embodiment generates the performer's live-action 3D model from numerous captured images by using a Volumetric Capture technology. More specifically, the 3D model generating section 312 generates the live-action 3D model on the basis of tens of captured images (multiple-viewpoint data) obtained by tens of cameras 311a capturing images of the performer simultaneously from various directions. The distribution servers 20 and the viewer terminals 10 then generate a high-quality live-action 3D video of the performer as the performer's live-action 3D model viewed from desired directions. The Volumetric Capture technology also permits generation of videos originally without the viewpoints of cameras (virtual viewpoint), which enables viewpoint manipulation with higher degrees of freedom.

(Encoding Section 313)

The encoding section 313 has the function of compressing, for transmission purposes, the 3D model data generated by the 3D model generating section 312. The 3D model is expressed by use of shape data and texture data, for example. The encoding section 313 compresses the shape data and the texture data by using compression formats suitable for the respective data forms. For example, MPEG-4 AFX (Animation Framework eXtension) or other open-source compression methods may be used to compress the shape data. Further, AVC (H.264) or HEVC (H.265) may be used to compress the texture data, for example.

(Transmitting Section 314)

The transmitting section 314 transmits the data compressed by the encoding section 313 to multiple distribution servers 20 (e.g., distribution servers 20A to 20C, etc., in FIG.

1). The transmitting section 314 further causes the compressed data to be timestamped, for example, for transmission.

Also, the transmitting section 314 may additionally transmit, to multiple distribution servers 20, mode information regarding the performer acquired from the data acquiring section 311. The mode information regarding the performer is information indicative of either a normal mode in which the direction of the performer is adjusted or an interaction mode in which the direction of the performer is not adjusted. The direction of the performer refers to the performer's direction relative to the audience. For example, in a case where viewer avatars are arranged around the stage on which the performer's live-action 3D model is positioned in the virtual space, the distribution server 20 adjusts the orientation (front direction) of the performer's live-action 3D model as needed such that the 3D model faces the avatars of the viewers at the distribution destinations. This can provide a positional relation in which the viewers feel like viewing the performer at the front row seats. Direction adjustment can be made during performances such as ordinary singing and dancing. On the other hand, in a case where the performer is talking to specific viewer avatars in a specific direction, the direction of the performer should preferably not be adjusted (it will be awkward if a performer is facing a viewer not included in other viewers whom the performer is talking to). In the case where the performer is talking to viewer avatars as described above, the "interaction mode" is set, and the distribution servers 20 are not allowed to adjust the direction of the performer. The "interaction mode" may be set by operation of a button on a microphone held by the performer. Alternatively, the "interaction mode" may be determined automatically by the control section of the imaging system 31 on the basis of the video acquired by the cameras 311a or the sound picked up by the microphone. As another alternative, the "interaction mode" may be set as needed by use of a button operated by the staff of the distributor side, including the performer.

<2-2. Distribution Servers 20>

Figure 4:
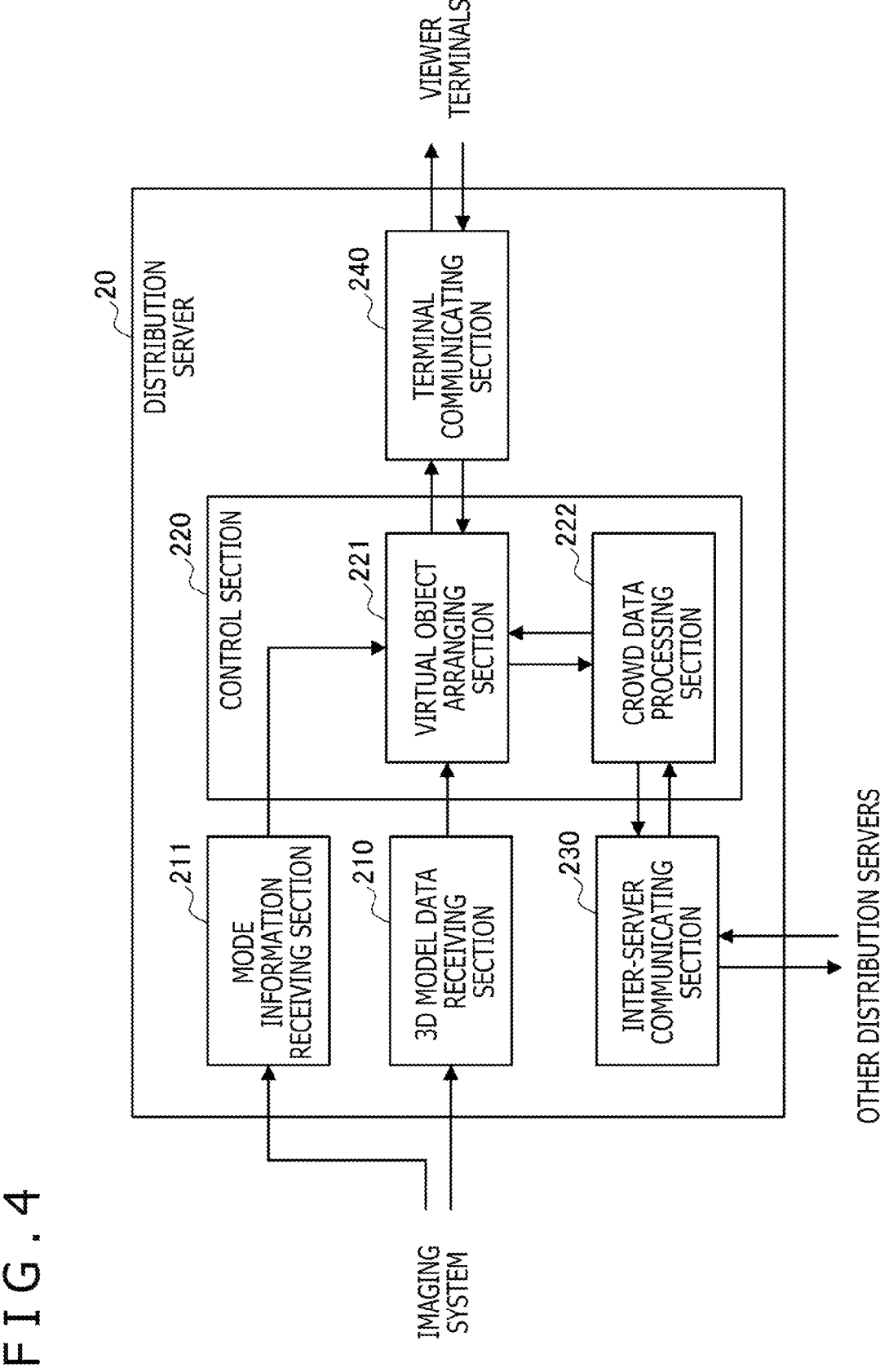
FIG. 4 is a block diagram depicting an exemplary configuration of a distribution server according to the present embodiment.

Explained next with reference to FIG. 4 is the configuration of one distribution server 20 that arranges virtual objects in the virtual space and provides information regarding the virtual space. The multiple distribution servers 20A to 20C, etc., in the present embodiment all have the same configuration.

FIG. 4 is a block diagram depicting an exemplary configuration of the distribution server 20 according to the present embodiment. As depicted in FIG. 4, the distribution server 20 includes a 3D model data receiving section 210, a mode information receiving section 211, a control section 220, an inter-server communicating section 230, and a terminal communicating section 240. The distribution server 20 may include multiple information processing apparatuses or may be a single information processing apparatus. Further, the 3D model data receiving section 210, the mode information receiving section 211, the inter-server communicating section 230, and the terminal communicating section 240 are presented as the functions of a communicating section of the distribution server 20.

(3D Model Data Receiving Section 210)

The 3D model data receiving section 210 receives 3D model data regarding the performer from the imaging system 31. In the present embodiment, compressed shape data and compressed texture data (data representing live-action 3D data) are received as the performer's 3D model data.

(Mode Information Receiving Section 211)

The mode information receiving section 211 receives, from the imaging system 31, mode information indicating whether the state of the performer is in the normal mode or in the interaction mode.

(Control Section 220)

The control section 220 functions as a virtual object arranging section 221 and a crowd data processing section 222. The virtual object arranging section 221 controls the arrangement of all virtual objects in the virtual space. All virtual objects include the virtual object of the performer as main content (live-action 3D model of the performer in the present embodiment) and the virtual objects of all viewers (viewer avatars). Further, all viewers include the viewer avatars associated with multiple viewer terminals 10 communicably connected with one distribution server 20 and the viewer avatars associated with multiple viewer terminals 10 communicably connected with the other distribution servers 20. Here, an exemplary arrangement of virtual objects in the virtual space is explained below with reference to FIG. 5.

Figure 5:
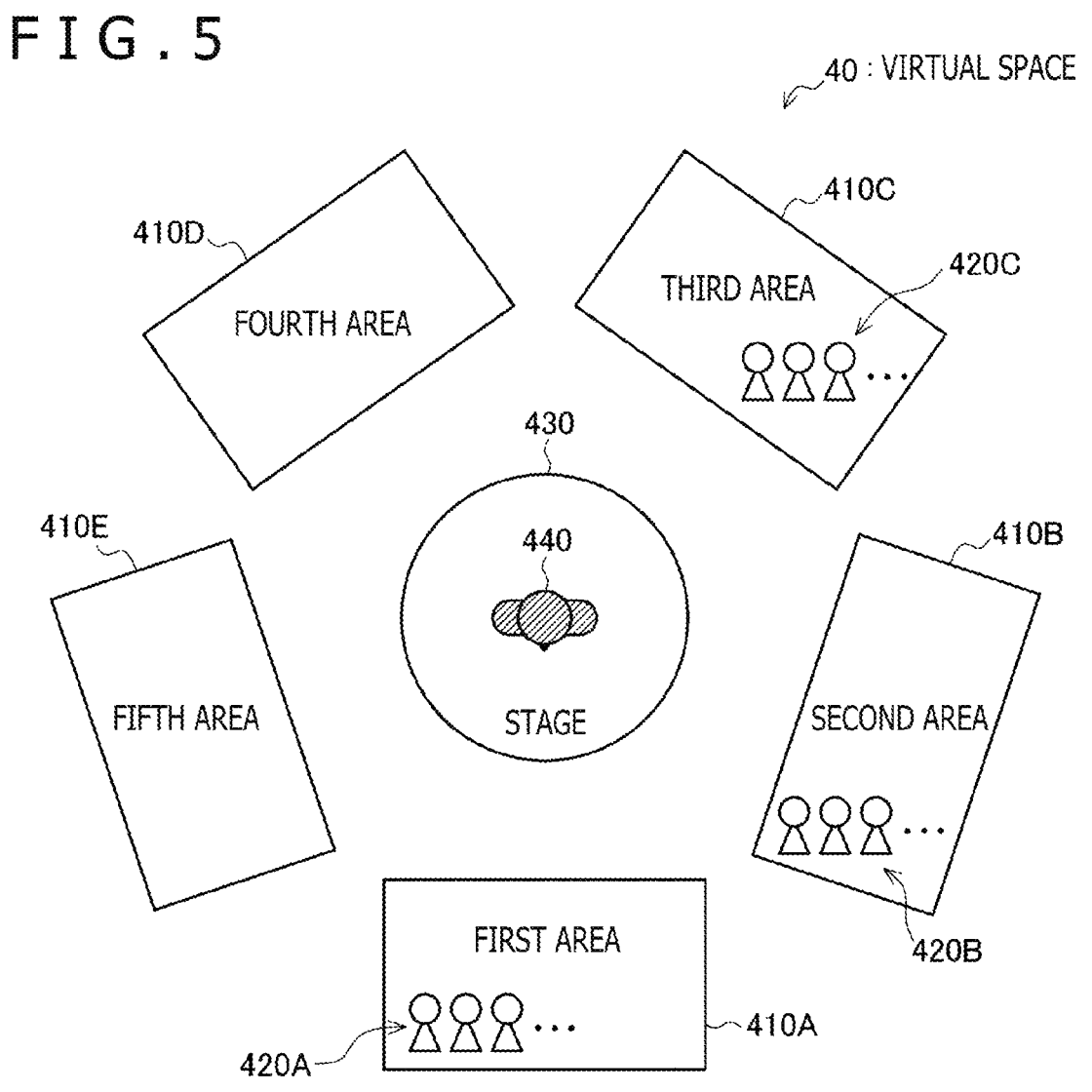

FIG. 5 is a diagram depicting an exemplary arrangement of virtual objects in a virtual space according to the present embodiment. In a virtual space 40 in FIG. 5, for example, a stage 430 is arranged at the center. Arranged around (in a circular pattern, for example) the stage 400 are multiple areas 410 (first area 410A to fifth area 410E). Further, arranged on the stage 430 is the performer's virtual object (e.g., live-action 3D model 440) as the main content. In each area 410, many viewer avatars (viewer avatar groups 420) are arranged as the audience. In such a manner, numerous viewer avatars view together the concert given by the performer in the virtual space 40. It is to be noted that the arrangement (relative to the position of the performer's 3D model) of the multiple areas 410 (410A to 410E) in which multiple viewer avatar groups 420 are arranged may correspond to the arrangement (relative to the performer) of the multiple display units 331 (331-1 to 331-5) around the real performer A indicated in FIG. 2. That is, for example, the viewer avatar group 420A arranged in the first area 410A may be displayed on the display unit 331-1, the viewer avatar group 420B in the second area 410B may be displayed on the display unit 331-2, and so on.

The virtual object arranging section 221 transmits, per frame, the data of the performer's live-action 3D model (compressed shape data and compressed texture data), the position of the performer's live-action 3D model (together with direction information in a case where the direction is adjusted), and the position and posture of each viewer avatar (along with various parameters for minutely moving the viewer avatars), as virtual space update information, to the viewer terminals 10 communicably connected with the distribution server 20. It is to be noted that the control section 220 of the distribution server 20 transmits beforehand the data necessary for rendering the virtual space, such as the data of each viewer avatar (3D model data) and the data regarding the background, the stage, and lighting. Further, the virtual space update information transmitted by the virtual object arranging section 221 to the viewer terminals 10 per frame includes information regarding staging such as lighting changes.

The virtual object arranging section 221 also performs control to transmit crowd data received by the inter-server communicating section 230 from the other distribution servers and processed as needed by the crowd data processing section 222, to the viewer terminals 10 communicably connected with the distribution server 20. The crowd data refers to the data used by the viewer terminals 10 for simplified display control (rendering control) of the numerous viewer avatars processed mainly by the other distribution servers. For example, the crowd data may be only the bone information indicative of rough body motions of the many viewer avatars. Alternatively, the crowd data may be only the bone information regarding some viewer avatars, among the numerous viewer avatars, who have expressed conspicuous motions (excitement). In this case, the crowd data processing section 222 expands the crowd data in a manner causing all of the numerous viewer avatars (or in units of tens of avatars, for example) to reflect the same bone information, the expanded crowd data being output to the virtual object arranging section 221.

Further, the virtual object arranging section 221 outputs, to the crowd data processing section 222, the motion information regarding each viewer avatar received by the terminal communicating section 240 from at least one viewer terminal 10. The crowd data processing section 222 generates the crowd data by extracting a portion of the motion information regarding the viewer avatars. The crowd data thus generated is transmitted by the inter-server communicating section 230 to the other distribution servers 20.

What follows is a more detailed explanation of the arrangement of viewer avatars with reference to FIG. 5. In the present embodiment, the viewer avatar group 420 formed by the viewer avatars corresponding to multiple viewer terminals 10 (the viewer terminals 10 which receive distribution from one distribution server 20) communicably connected with the one distribution server 20 is arranged in the corresponding area 410 (410A to 410E) in FIG. 5 that is associated with the one distribution server 20. For example, the first area 410A is associated with the distribution server 20A. Arranged in the first area 410A is the viewer avatar group 420A formed by the viewer avatars corresponding to the multiple viewer terminals 10A-1 to 10A-3, etc., communicably connected with the distribution server 20A. Further, the second area 410B is associated with the distribution server 20B. Arranged in the second area 410B is the viewer avatar group 420B formed by the viewer avatars corresponding to the multiple viewer terminals 10B-1 to 10B-3, etc., communicably connected with the distribution server 20B. Similarly, each of the areas is associated with a pair of distribution servers 20, the area accommodating the arrangement of the viewer avatars corresponding to the multiple viewer terminals 10 communicably connected with the corresponding distribution server 20. That is, the viewer avatars processed mainly by one distribution server 20 are arranged in the same area.

It is to be noted that, although five areas are used in the example in FIG. 5, this is not limitative of the present embodiment. The concert venue in the virtual space may have as many areas as the distribution servers 20 included in this system. Further, each area 410 may be formed by multiple audience seats or may be formed by enclosing fences. Moreover, each area 410 may be expressed as a floating island or a floating cloud, for example. The use of the fences or the creation of the state of floating on the water or in the air allows the viewers to intuitively understand that the other areas constitute different groups.

In addition, each distribution server 20 may arrange, at a distance (afar), areas different from the one with which the distribution server 20 in question is associated (i.e., other areas). The distance is not limited to any specific length. For example, the other areas may be at such a distance that the viewer avatars arranged in these areas are not sufficiently visible. Specifically, the distance may be such that, when seen from the viewpoints of the viewer avatars arranged in a given area, the facial expressions of the viewer avatars in the other areas are not clearly visible. In an example of that state, the numerous viewer avatars arranged in the other areas may presumably be seen as a chunk that looks like a crowd from the viewpoints of the viewer avatars arranged in the given area.

The viewer avatars arranged in a given area may move freely within that area or may each be fixedly assigned to a particular viewing position (audience seat). The distributor side that distributes content such as a live concert may suitably determine how the viewer avatars are to be arranged, or the virtual-space administrator side providing a VR venue may set the arrangement beforehand. When the virtual space video is rendered from the viewpoint (viewing position) of a viewer avatar at a given viewer terminal 10, the viewer avatars adjacent to this viewer avatar arranged at the given viewer terminal 10 or those located nearby are also rendered. This enables the viewers to have an experience that feels like sharing the space with other people.

Here, in this system, when the virtual space video is rendered by a viewer terminal 10 from the viewpoint of its viewer avatar, detailed render control may be performed on the viewer avatars in the same area. The detailed rendering control involves, for example, moving more parts and portions of the viewer avatars such as their facial expressions, face orientations, hair, garments, limbs, fingers, and bodies (postures). The motions of the viewer avatars can be controlled on the basis of the information (motion information) acquired from the corresponding real viewers. The information regarding the motions of the viewer avatars in the same area may be transmitted from the distribution server 20 to the viewer terminal 10 as update information (various parameters for minutely moving the viewer avatars, the parameters being transmitted together with "position and posture of each viewer avatar" discussed above). This enables the viewer avatars in the same area to minutely reflect the reactions of the corresponding viewers in real time, which, in turn, makes it possible for the viewers to communicate with other people in a more realistic manner and to share the virtual space.

On the other hand, when a viewer terminal 10 renders the virtual space video from the viewpoint of the corresponding viewer avatar, simplified rendering control is performed on the numerous viewer avatars arranged in the other areas (e.g., a viewer avatar group seen as a distant chunk that looks like a crowd). The simplified rendering control may involve presenting rough body motions based only on the bone information. Such simplified rendering control is executed by use of the crowd data (motion information in reduced amount) transmitted from the communicably-connected distribution server 20.

That is, the numerous viewer avatars arranged in the other areas are viewer avatars that correspond to the viewer terminals 10 (e.g., viewer terminals 10B) communicably connected with another distribution server 20 (e.g., the distribution server 20B) different from the distribution server 20 (e.g., the distribution server 20A) communicably connected with the viewer terminals 10 (e.g., the viewer terminals 10A). Further, the crowd data is data that is transmitted from another distribution server (e.g., the distribution server 20B) to the distribution server (e.g., the distribution server 20A) communicably connected with the viewer terminals 10 (e.g., the viewer terminals 10A).

As described above, even if the numerous viewer avatars arranged in the other areas are rendered in a simplified manner because their areas are distantly located (e.g., the facial expressions of the avatars are fixed, with only rough body motions reflected), the viewers are practically unaware of the simplified control, of the coarseness of control, or of the attendant low resolution. It is to be noted that the simplified rendering also involves having the same motion reflected by the viewer avatars in units of tens (i.e., viewer avatars are not individually controlled), for example.

The simplified rendering control (display control) entails a fewer processing load than detailed rendering control (display control). The present embodiment enables more avatars than those can be handled by one distribution server to share the virtual space when the viewer avatars processed mainly by the other distribution servers are displayed in the other areas in the virtual space under simplified rendering control based on the crowd data transmitted from the other distribution servers.

It is to be noted that, although rendering control of the virtual space (including generation of videos from the viewer avatar's viewpoint in the virtual space) is performed by each viewer terminal 10 in the present embodiment, for example, this is not limitative of the present embodiment. Alternatively, the distribution servers 20 may carry out the rendering control. The distribution servers 20 may generate videos from the viewer avatar's viewpoint and transmit the generated videos to the viewer terminals 10.

Also, on the basis of relocation information included in the viewer avatar motion information transmitted from each viewer terminal 10, the virtual object arranging section 221 may change the position of the corresponding viewer avatar in the virtual space and transmit, to the viewer terminal 10, the information regarding the new position as the update information. Further, on the basis of the relocation information attached to the performer's 3D model data transmitted from the imaging system 31, the virtual object arranging section 221 may change the position of the performer's 3D model and transmit the information regarding the new position to each viewer terminal 10 as the update information. On the basis of the captured images of the performer, depth information regarding the performer, and instruction information input by the distributor-side staff, the imaging system 31 may extract the performer's relocation information (position change amount and three-dimensional position information) and attach the extracted information to the 3D model data for transmission.

Also, the virtual object arranging section 221 may adjust the orientation of the performer's 3D model in the virtual space on the basis of the mode information transmitted from the imaging system 31. Specifically, in the case of the "normal mode" indicating that the performer is doing a normal performance such as singing and dancing, the virtual object arranging section 221 performs control to orient the performer's 3D model toward the position of the viewer avatar (viewing position) of the viewer terminal 10 at each distribution destination. This makes it possible to provide all viewers with an experience of viewing the performer from the front. The virtual object arranging section 221 transmits the information regarding the adjusted direction to the viewer terminals 10 together with the position information regarding the performer's 3D model.

Further, in the case of the "interaction mode" in which the performer is naturally facing a specific direction, such as the case where the performer is talking in a specific direction, the virtual object arranging section 221 does not adjust the orientation of the performer's 3D model. This enables all viewers to share a state of viewing the performer facing a specific direction and talking to specific viewer avatars.

Figure 6:
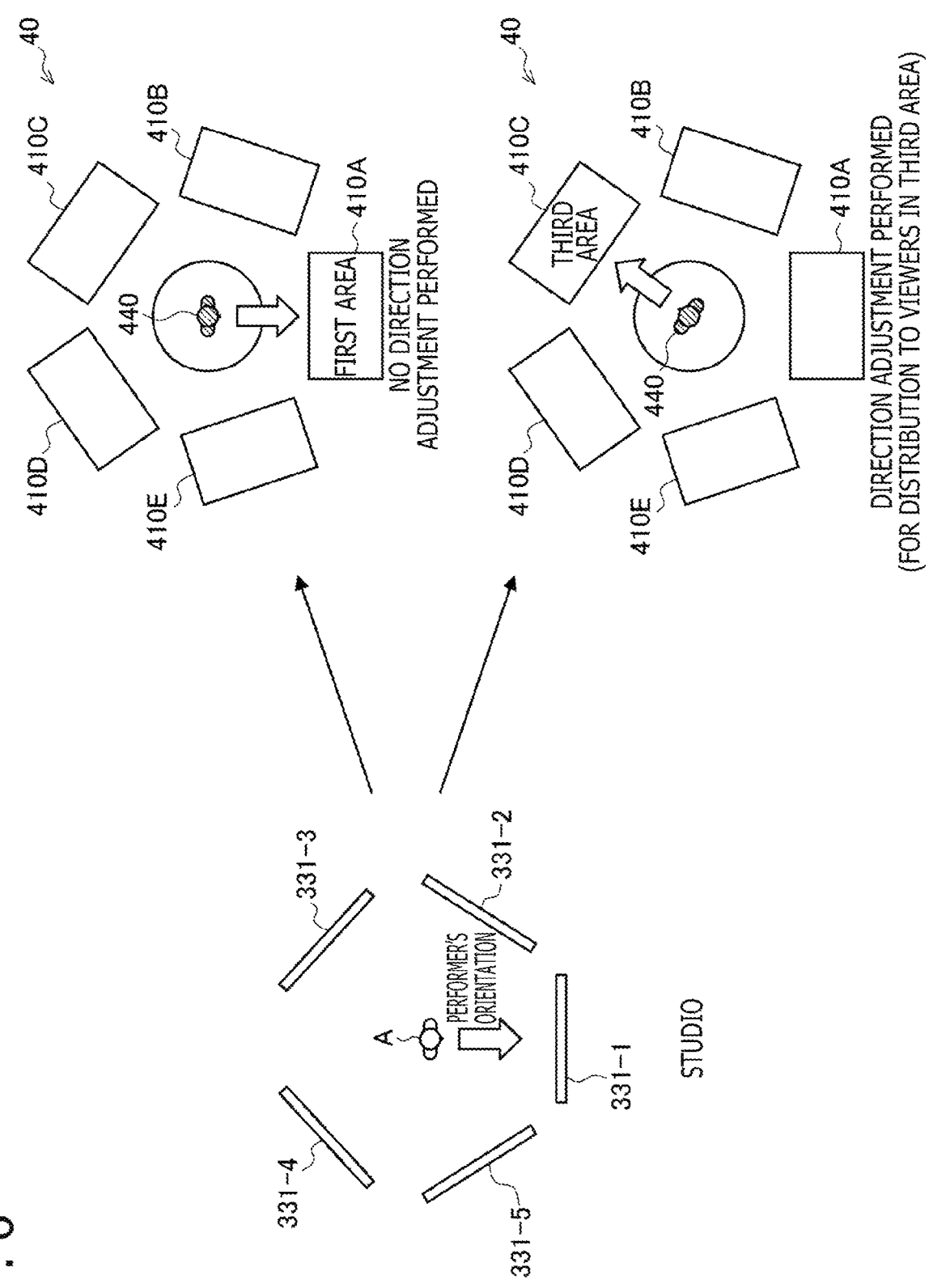
FIG. 6 is a diagram explaining direction adjustment of a 3D model of a performer according to the present embodiment.

FIG. 6 is a diagram explaining direction adjustment of the performer's 3D model according to the present embodiment.

As depicted in FIG. 6, the present embodiment assumes a case where the arrangement of multiple display units 331 (331-1 to 331-5) set around the performer A in a studio doing imaging in real time corresponds to the arrangement of multiple areas 410 (410A to 410E) around the stage on which the performer's 3D model is positioned in the virtual space.

The display system 33 may control each display unit 331 to display the viewer avatars in the corresponding area 410. The manner of displaying each viewer avatar is not limited to anything specific. For example, the display system 33 may juxtapose, in a panel pattern, the videos of the viewer avatars, or display the video of an entire area as viewed from on the stage in the virtual space (i.e., a video in which numerous viewer avatars arranged in the area appear). This allows the performer A to do a performance while watching the (excited) state of the audience (viewer avatars).

As indicated in the left part of FIG. 6, suppose that, for example, in a case where the performer A is facing the direction of the display unit 331-1, the arrangement of a live-action 3D model 440 of the performer is controlled in the virtual space 40 with no direction adjustment. This brings about a state where the performer's live-action 3D model 440 is facing the direction of the first area 410A corresponding to the display unit 331-1, as depicted in the top right part of FIG. 6. No direction adjustment is performed in the case of the "interaction mode" in which the performer is naturally facing a specific direction, such as a case where the performer is talking to the viewer avatars in the first area 410A. This enables the viewers in all areas to share the state in which the performer is facing the direction of the first area.

Meanwhile, the bottom right part of FIG. 6 depicts am example in which direction adjustment is performed. For example, in a case where the distribution server 20C associated with the third area 410C carries out direction adjustment for the sake of a distribution destination, the distribution server 20C performs arrangement control in such a manner that the performer's live-action 3D model 440 faces the direction of the viewer avatars in the third area 410C (i.e., viewers at the distribution destination of the distribution server 20C), as depicted in the bottom right part of FIG. 6. This makes it possible to view the performer from the front from the viewpoints of the viewer avatars arranged in the third area 410C. Similar control is carried out by each distribution server 20. This makes it possible to provide all viewers with an experience of viewing the performer from the front.

It is to be noted that, although it is explained above that, in the present embodiment, the display units 331 displaying the viewer avatars are arranged around the performer A in the studio, for example, this is not limitative of the present disclosure. Alternatively, the viewer avatars may not be displayed, or the display units 331 may not be arranged. In this case, at least the performer A may clearly be presented with information indicating which area is arranged in which direction in the virtual space. For example, the name of the area may be displayed in a text form on the display unit arranged in each direction, or a sheet of paper printed with the area name may be positioned in each direction. This allows the performer A to perform motions such as talking to a specific area.

(Inter-Server Communicating Section 230)

The inter-server communicating section 230 has the function of being communicably connected with the other distribution servers 20 to transmit and receive crowd data thereto and therefrom.

(Terminal Communicating Section 240)

The terminal communicating section 240 has the function of being communicably connected with the viewer terminals 10 to transmit and receive data thereto and therefrom. For example, the terminal communicating section 240 continuously receives the motion information regarding the viewer avatars from the communicably-connected viewer terminals 10 and inputs the received motion information to the virtual object arranging section 221. Also, the terminal communicating section 240 may receive, from the viewer terminals 10 upon initial connection, the data for rendering the viewer avatars (e.g., 3D CG character data). Further, the terminal communicating section 240 transmits virtual space information (i.e., data necessary for rendering the virtual space) to the viewer terminals 10. Upon initial connection, for example, the terminal communicating section 240 transmits each viewer avatar's data (e.g., 3D CG character data), background data, stage data, and lighting data under control of the control section 220. Also, the terminal communicating section 240 continuously (e.g., once per frame) transmits, to the viewer terminals 10, the virtual space update information output from the virtual object arranging section 221.

<2-3. Viewer Terminals 10>

Explained next with reference to FIG. 7 is the configuration of the viewer terminal 10 for use by the viewer in viewing virtual space video.

FIG. 7 is a block diagram depicting an exemplary configuration of a viewer terminal according to the present embodiment. As depicted in FIG. 7, the viewer terminal 10 includes a communicating section 110, a decoding section 120, a rendering section 130, a display section 140, and a sensor section 150. The viewer terminal 10 may include multiple information processing apparatuses or may be a single information processing apparatus. Further, the decoding section 120 and the rendering section 130 are presented as the functions of a control section of the viewer terminal 10.

For example, the viewer terminal 10 may be implemented with a non-transparent HMD (Head Mounted Display) covering the entire field of view of the viewer. Alternatively, the viewer terminal 10 may be implemented by use of various devices such as a smartphone, a tablet terminal, a PC, a projector, a game terminal, a TV set, or a wearable device.

(Communicating Section 110)

The communicating section 110 is communicably connected with the distribution server 20 to transmit and receive data thereto and therefrom. For example, the communicating section 110 receives the data for rendering the virtual space from the distribution server 20. Also, the communicating section 110 transmits various kinds of sensing data detected by the sensor section 150 to the distribution server 20 as the viewer avatar motion information. The sensing data may be position and posture information regarding the viewer, for example. Further, the communicating section 110 may transmit, to the distribution server 20, the viewer avatar motion information obtained by causing the rendering section 130, to be discussed later, to reflect the sensing data detected by the sensor section 150.

(Decoding Section 120)

The decoding section 120 decodes, as needed, the data received from the distribution server 20 via the communicating section 110. The decoding section 120 decodes different types of data by using corresponding decoders. For example, the decoding section 120 decodes compressed shape data and compressed texture data, which are the performer's live-action 3D model data received from the distribution server 20, and inputs the decoded data to the rendering section 130.

(Sensor Section 150)

The sensor section 150 is implemented by use of various sensors for detecting the state of the viewer. For example, the sensor section 150 may be an IMU (Inertial Measurement Unit), a camera, an IR sensor, a microphone, a biosensor, or the like. The sensor section 150 may detect the viewer's motion (position, posture, limb motion, head motion, etc.) by using the IMU, or detect the viewer's facial expressions (motion of eyes, eyebrows and mouth, etc.) or the viewer's line of sight by using the camera, for example. The sensor section 150 may further detect the viewer's spoken voice by using the microphone, for example. Further, the sensor section 150 may include multiple types of sensors.

It is to be noted that, although the present embodiment uses the sensing data detected by the sensor section 150 as the information for controlling the viewer avatars (i.e., as operating information), this is not limitative of the present disclosure. Alternatively, for example, the viewer avatar operating information may be detected from a controller operated by the viewer (the operation of buttons and switches, the manipulation and tilting of a joystick, etc.). As another alternative, the viewer avatar operating information may be input from various operation input parts such as a keyboard, a mouse, and a touch pad.

(Rendering Section 130)

The rendering section 130 has the function of performing rendering control on the virtual space on the basis of information received from the distribution server 20. Specifically, the rendering section 130 creates a virtual space and generates a video from the viewpoint of a viewer avatar arranged in that virtual space. The video from the viewpoint of a viewer avatar may be a video that may or may not include the viewer avatar of the viewer in the field-of-view.

Arranged in the virtual space are the performer's live-action 3D model as the main content and the viewer avatars as the audience as described above. The performer's live-action 3D model may be expressed by use of the decoded shape data and texture data. The areas and the viewer avatars are arranged and the viewer avatars are subjected to simplified or detailed rendering control, as discussed above with reference to FIG. 7.

Further, the virtual space video generated by the rendering section 130 from the viewpoint of the viewer avatar may be either a three-dimensional image or a two-dimensional image.

Also, the rendering section 130 controls the viewpoint position and field-of-view direction of the viewer avatar on the basis of the sensing data detected by the sensor section 150. For example, the rendering section 130 controls the viewer avatar's viewpoint and field-of-view direction according to the head and line-of-sight motions (up, down, left and right motion, tilt motion, front-back motion, etc.) detected by the sensor section 150.

Further, the rendering section 130 may manipulate the viewer avatar on the basis of the sensing data detected by the sensor section 150. Specifically, the rendering section 130 controls the facial expressions, hair motion, garment motion, position, posture, and body motion (raising an arm, squatting, jumping, etc.) of the viewer avatar. For example, the rendering section 130 may control the mouth motion and facial expressions of the viewer avatar on the basis of the spoken voice picked up by the microphone. Also, the rendering section 130 may control the facial expressions (including the line of sight) of the viewer avatar on the basis of images of the viewer's face and eyes captured by the camera. Further, the rendering section 130 may control the facial expressions, hair motion, garment motion, position, posture, and body motion (raising an arm, squatting, jumping, etc.) of the viewer avatar on the basis of motion data such as the acceleration and angular velocity of the head and other body parts.

The viewer terminal 10 allows the communicating section 110 to continuously transmit, to the distribution server 20, the viewer avatar motion information (various parameters for moving the viewer avatar) obtained by causing the rendering section 130 to reflect the viewer's various kinds of sensing data. The viewer avatar motion information transmitted to the distribution server 20 may at least include the position and posture, for example.

Also, the rendering section 130 generates the performer's live-action 3D video in the virtual space on the basis of the performer's live-action 3D model data.

The rendering section 130 then performs control to display the generated video on the display section 140.

(Display Section 140)

The display section 140 has the function of presenting the virtual space video to the viewer. For example, the display section 140 may be implemented as a 2D display unit, a 3D display unit, a projector, a three-dimensional hologram display device, or the like.

The configuration of the viewer terminal 10 is explained above. It is to be noted that the configuration of the viewer terminal 10 is not limited to the example indicated in FIG. 7. For example, the viewer terminal 10 may include a display device having at least the display section 140 and the sensor section 150 and a control device having at least the communicating section 110 and the rendering section 130.

3. OPERATIONAL PROCESSING

FIG. 8 is a flowchart indicating an exemplary flow of operational processing performed by the distribution server 20 according to the present embodiment.

As indicated in FIG. 8, the distribution server 20 first acquires the performer's 3D model data from the imaging system 31 (step S103).

Next, the distribution server 20 acquires the crowd data from the other distribution servers (step S106).

The distribution server 20 then acquires the viewer avatar motion information from the viewer terminal 10 (step S109).

The control section 220 of the distribution server 20 then determines the mode of the performer on the basis of the mode information acquired from the imaging system 31 (step S112). In the present embodiment, the imaging system 31 can transmit the mode information indicative of either the normal mode or the interaction mode.

Next, in the case of the normal mode (Normal in step S112), the virtual object arranging section 221 of the distribution server 20 adjusts the orientation of the performer's 3D model arranged in the virtual space, in such a manner that the performer's 3D model faces the direction of the viewer avatar of the viewer at the distribution destination (step S115). In the case of the interaction mode (Interaction in step S112), on the other hand, the virtual object arranging section 221 does not perform direction adjustment.

The virtual object arranging section 221 then performs control to arrange all virtual objects in the virtual space (step S118). Specifically, the virtual object arranging section 221 updates the arrangement of each virtual object in the virtual space. The arrangement may be updated on the basis of the result of direction adjustment or the viewer avatar motion information transmitted from the viewer terminal 10.

The virtual object arranging section 221 then transmits the virtual space information to the viewer terminal 10 as virtual space update information (step S121). The virtual space information includes information regarding the updated arrangement (position) of the virtual object, viewer avatar motion information for detailed rendering, and crowd data (for simplified rendering) acquired from the other distribution servers.

The distribution server 20 repeats the above-described processes of steps S109 to S121 on each viewer at the distribution destination (step S124).

Next, when the processing on the viewers of all destinations of distribution performed by the distribution server 20 is completed (No in step S124), the crowd data processing section 222 generates the crowd data by extracting a portion of the viewer avatar motion information received from the viewer terminals 10 at the distribution destinations (step S127). Specifically, for example, the crowd data processing section 222 may generate the crowd data by extracting the bone information from the motion information regarding the viewer avatars of all viewers at the distribution destinations (i.e., all viewer avatars mainly processed by the distribution server 20). Alternatively, the crowd data processing section 222 may generate the crowd data by extracting the bone information from the viewer avatars producing at least a given amount of motion from among the viewer avatars of all viewers at the distribution destinations (i.e., all viewer avatars mainly processed by the distribution server 20). For example, the bone information regarding only the viewer avatars with conspicuous body motion or the bone information regarding only the viewer avatars making big arm swings may be extracted. In such a manner, the crowd data in reduced data amount may be generated by extracting only the bone information regarding the view avatars making distinctive motions, for example.

The distribution server 20 then allows the inter-server communicating section 230 to transmit the crowd data to the other distribution servers (step S130).

Explained above is the operational processing performed by the distribution server 20 of the present embodiment. It is to be noted that the flow of the operational processing indicated in FIG. 7 is only an example and is not limitative of the present disclosure. For example, the processes of steps S103 to S112 in FIG. 7 may be carried out in parallel with one another or in a different order. Further, the processing indicated in FIG. 8 may be executed once per frame.

4. EXEMPLARY HARDWARE CONFIGURATION

Figure 9:
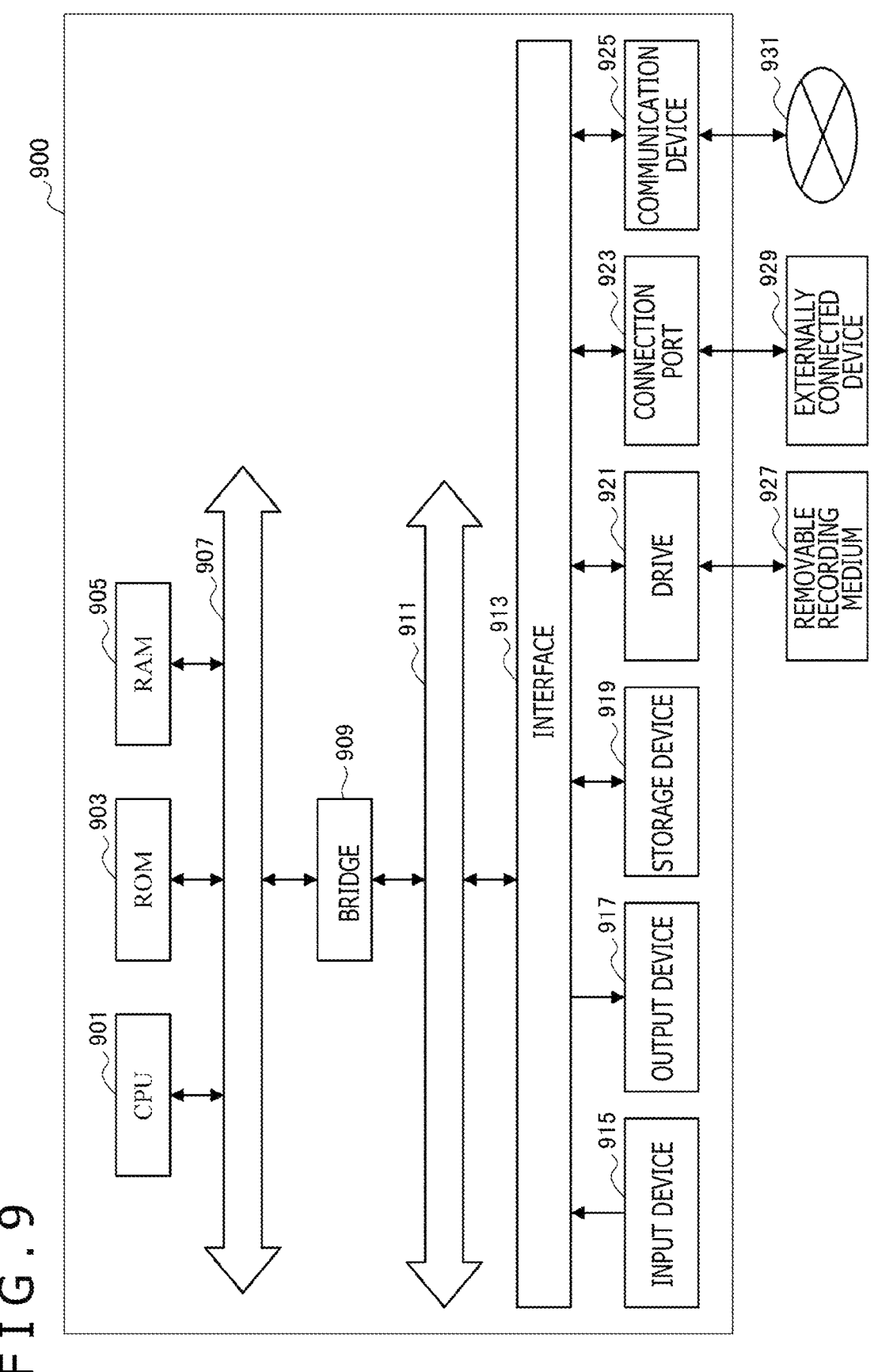
FIG. 9 explains an exemplary hardware configuration of an information processing apparatus according to the embodiment of the present disclosure.

Next, an exemplary hardware configuration of an information processing apparatus according to the embodiment of the present disclosure is explained below with reference to FIG. 9. The above-described processes performed by the viewer terminal 10, the distribution server 20, the imaging system 31, and the display system 33 may be implemented by use of a single or multiple information processing apparatuses. FIG. 9 is a block diagram depicting an exemplary hardware configuration of an information processing apparatus 900 implementing the viewer terminal 10, the distribution server 20, the imaging system 31, or the display system 33 according to the embodiment of the present disclosure.

It is to be noted that the information processing apparatus 900 need not necessarily have all hardware components depicted in FIG. 9. Further, the viewer terminal 10, the distribution server 20, the imaging system 31, or the display system 33 may lack parts of the hardware configuration indicated in FIG. 9.

As depicted in FIG. 9, the information processing apparatus 900 includes a CPU (Central Processing unit) 901, a ROM (Read Only Memory) 903, and a RAM (Random Access Memory) 905. The information processing apparatus 900 may also include a host bus 907, a bridge 909, an external bus 911, an interface 913, an input device 915, an output device 917, a storage device 919, a drive 921, a connection port 923, and a communication device 925. In place of, or in addition to, the CPU 910, the information processing apparatus 900 may have a processing circuit called a GPU (Graphics Processing Unit), a DSP (Digital Signal Processor), or an ASIC (Application Specific Integrated Circuit).

The CPU 901, which functions as an arithmetic processing unit and a control unit, controls part or all of the operations inside the information processing apparatus 900 according to various programs recorded in the ROM 903, the RAM 905, or the storage device 919, or on a removable recording medium 927. The ROM 903 stores the programs and operation parameters for use by the CPU 901. The RAM 905 temporarily stores the programs for execution by the CPU 901 as well as the parameters that may be varied as needed during the program execution. The CPU 901, the ROM 903, and the RAM 905 are interconnected via the host bus 907 constituted by an internal bus such as a CPU bus. The host bus 907 is also connected via the bridge 909 with the external bus 911 such as a PCI (Peripheral Component Interconnect/Interface) bus. For example, the 3D model generating section 312 and the encoding section 313, the control section 220, or the decoding section 120 and the rendering section 130 in the present embodiment may be implemented by the CPU 901.

For example, the input device 915 is a device operated by the user, such as buttons. The input device 915 may include a mouse, a keyboard, a touch panel, switches, levers, and the like. The input device 915 may further include a microphone for detecting the user's voice. For example, the input device 915 may be a remote controller that utilizes infrared rays or other radio waves. The input device 915 may alternatively be an externally connected device 929 such as a mobile phone that supports the operations of the information processing apparatus 900. The input device 915 includes an input control circuit that generates input signals on the basis of the information input by the user and outputs the generated signals to the CPU 901. By operating the input device 915, the user inputs various kinds of data to the information processing apparatus 900 and instructs the information processing apparatus 900 to perform desired processing operations.

The input device 915 may further include an imaging device and sensors. For example, the imaging device is a device that generates captured images by capturing the real space with use of an imaging element such as a CCD (Charge Coupled Device) or a CMOS (Complementary Metal Oxide Semiconductor) as well as various members such as lenses for controlling the formation of subject images on the imaging element. The imaging device may capture still images or moving images.

For example, various sensors may be provided, such as a distance measuring sensor, an acceleration sensor, a gyro sensor, a geomagnetic sensor, a vibration sensor, an optical sensor, and a sound sensor. The sensors acquire information regarding the state of the information processing apparatus 900 itself such as the posture of its housing, as well as information regarding the surrounding environment of the information processing apparatus 900 such as the brightness and noise in its surroundings, for example. The sensors may further include a GPS (Global Positioning System) sensor that receives GPS signals to thereby measure the longitude, latitude, and altitude of the apparatus.

The output device 917 is configured as a device capable of visually or audibly notifying the user of the acquired information. For example, the output device 917 may be a display device such as an LCD (Liquid Crystal Display) or an organic EL (Electro-Luminescence) display, a sound output device such as a speaker or headphones, or other devices. Further, the output device 917 may include a PDP (Plasma Display Panel), a projector, a hologram device, or a printer device. The output device 917 outputs the result of the processing performed by the information processing apparatus 900 in the form of a text, a video including images, or sound such as a voice or acoustic output. The output device 917 may further include a lighting device that illuminates the surroundings.

The storage device 919 is a data storage device configured as an exemplary storage section of the information processing apparatus 900. For example, the storage device 919 is constituted by a magnetic storage device such as HDD (Hard Disk Drive), a semiconductor storage device, an optical storage device, or a magneto-optical storage device. The storage device 919 stores the programs and various kinds of data executed or operated on by the CPU 901 as well as various kinds of data acquired from the outside.

The drive 921 serves as a reader-writer for the removable recording medium 927 such as a magnetic disk, an optical disk, a magneto-optical disk, or a semiconductor memory. The drive 921 is built in, or attached externally to, the information processing apparatus 900. The drive 921 reads information recorded on the removable recording medium 927 and outputs the retrieved information to the RAM 905. Also, the drive 921 writes records to the attached removable recording medium 927.

The connection port 923 is a port that directly connects devices to the information processing apparatus 900. For example, the connection port 923 may be a USB (Universal Serial Bus) port, an IEEE 1394 port, or an SCSI (Small Computer System Interface) port. The connection port 923 may alternatively be an RS-232C port, an optical audio terminal, or an HDMI (registered trademark) (High-Definition Multimedia Interface) port. With the externally connected device 929 connected to the connection port 923, various kinds of data may be exchanged between the information processing apparatus 900 and the externally connected device 929.

The communication device 925 is, for example, a communication interface constituted by a communication device for connection with a network 931. For example, the communication device 925 may be a communication card for use with a wired or wireless LAN (Local Area Network), Bluetooth (registered trademark), Wi-Fi (registered trademark), or WUSB (Wireless USB). Alternatively, the communication device 925 may be an optical communication router, an ADSL (Asymmetric Digital Subscriber Line) router, or a modem for various communication purposes. The communication device 925 transmits and receives signals or the like to and from the Internet or other communication devices, for example, by using a predetermined protocol such as TCP/IP. Further, the network 931 is connected to the communication device 925 in a wired or wireless manner. For example, the network 931 is the Internet, a domestic LAN, an infrared-ray communication network, a radio wave communication network, a satellite communication network, or other networks.

5. SUPPLEMENTARY NOTES

Whereas the preferred embodiment of the present disclosure has been described above in detail with reference to the accompanying drawings, the embodiment is not limitative of the present technology. It is obvious that those skilled in the art will easily conceive variations or alternatives of the present disclosure within the scope of the technical idea stated in the appended claims. It is to be understood that such variations, alternatives, and other ramifications also fall within the technical scope of the present disclosure.

For example, the 3D model of the performer is not limited to the live-action 3D model. The performer's 3D model may alternatively be a 3D CG character.

Further, the distribution server 20 may be configured not to have the mode information receiving section 211. That is, the distribution server 20 may dispense with the function of adjusting the performer's orientation based on the mode information.

Moreover, the information processing system according to the present embodiment may be configured not to have the display system 33 indicated in FIG. 1.

In addition, at least one computer program may be created to enable the hardware such as the CPU, the ROM, and the RAM incorporated in the above-described information processing apparatus 900 to exert the processing functions of the viewer terminals 10, the distribution servers 20, the imaging system 31, or the display system 33. A computer-readable storage medium for storing such at least one computer program may also be provided.

Furthermore, the advantageous effects stated in this description are only for illustrative purposes and are not limitative of the present disclosure. That is, in addition to or in place of the above-described advantageous effects, the technology of the present disclosure may provide other advantageous effects that will be obvious to those skilled in the art in view of the above description.

It is to be noted that the present technology can also adopt the following configuration.

(1)
  An information processing apparatus including:
  a control section configured to perform control to distribute, to at least one viewer terminal, information regarding a virtual space in which a virtual object of a performer and a virtual object of a viewer are arranged,
  in which, of the virtual objects of all viewers arranged in the virtual space, for a virtual object of a viewer at a distribution destination of another information processing apparatus, the control section uses information received from the other information processing apparatus, as motion information regarding the virtual object of the viewer at the distribution destination of the other information processing apparatus, the received information being smaller in amount than the motion information to be used for the virtual object of the viewer at a distribution destination of the control section.

(2)
  The information processing apparatus according to (1),
  in which the virtual space has multiple areas set up therein, each of the areas having the virtual object of at least one viewer arranged therein, and the control section arranges the virtual objects of the viewers at all distribution destinations of the control section in one area, the control section further arranging the virtual objects of the viewers at all distribution destinations of the other information processing apparatus in another area different from the one area.

(3)

The information processing apparatus according to (2), in which the one area and the other area are arranged at a predetermined distance from each other in the virtual space.

(4)

The information processing apparatus according to (2) or (3), in which a motion of the virtual object of the viewer arranged in the other area is subjected to simplified display control using the information smaller in amount than the motion information.

(5)

The information processing apparatus according to (4), in which the information smaller in amount than the motion information includes bone information regarding a viewer avatar as the virtual object of the viewer.

(6)

The information processing apparatus according to any one of (1) to (5), in which the virtual objects of the viewers more numerous than those that a single information processing apparatus is capable of processing are arranged in the virtual space.

(7)

The information processing apparatus according to any one of (1) to (6), in which the control section performs control to transmit, to the other information processing apparatus, information generated by extracting a portion of the motion information regarding the virtual objects of the all viewers at the distribution destinations of the control section.

(8)

The information processing apparatus according to (7), in which the information generated by extracting a portion of the motion information is smaller in amount than the motion information.

(9)

The information processing apparatus according to (7) or (8), in which the information generated by extracting a portion of the motion information includes bone information regarding a viewer avatar as the virtual object of the viewer.

(10)

The information processing apparatus according to any one of (1) to (9), in which the control section performs direction adjustment to orient the virtual object of the performer in the virtual space in a direction in which the virtual object of the viewer at the distribution destination is positioned.

(11)

The information processing apparatus according to any one of (1) to (10), in which the virtual object of the performer includes a live-action 3D model generated on the basis of multiple images captured of the performer simultaneously from multiple directions.

(12)

An information processing method including: by a processor, performing control to distribute, to at least one viewer terminal, information regarding a virtual space in which a virtual object of a performer and a virtual object of a viewer are arranged; and of the virtual objects of all viewers arranged in the virtual space, for a virtual object of a viewer at a distribution destination of another information processing apparatus, using information received from the other information processing apparatus, as motion information regarding the virtual object of the viewer at the distribution destination of the other information processing apparatus, the received information being smaller in amount than the motion information to be used for the virtual object of the viewer at a distribution destination of the distribution control.

(13)

A program for causing a computer to function as: a control section configured to perform control to distribute, to at least one viewer terminal, information regarding a virtual space in which a virtual object of a performer and a virtual object of a viewer are arranged, in which, of the virtual objects of all viewers arranged in the virtual space, for a virtual object of a viewer at a distribution destination of another information processing apparatus, the control section uses information received from the other information processing apparatus, as motion information regarding the virtual object of the viewer at the distribution destination of the other information processing apparatus, the received information being smaller in amount than the motion information used to be for the virtual object of the viewer at a distribution destination of the control section.

REFERENCE SIGNS LIST 10 (10A, 10B, 10C): Viewer terminal
110: Communicating section
120: Compounding section
130: Rendering section
140: Display section
150: Sensor section
20 (20A, 20B, 20C): Distribution server
210: 3D model data receiving section
211: Mode information receiving section
220: Control section
221: Virtual object arranging section
222: Crowd data processing section
230: Inter-server communicating section
240: Terminal communicating section
31: Imaging system
311: Data acquiring section
311a: Camera
312: 3D model generating section
313: Encoding section
314: Transmitting section
33: Display system
331: Display unit
900: Information processing apparatus

The invention claimed is:
1. An information processing apparatus comprising:
circuitry configured to perform control to distribute, to at least one viewer terminal, information regarding a virtual space in which a virtual object of a performer and a virtual object of a viewer are arranged, and use, from among a plurality of virtual objects of all viewers arranged in the virtual space, for each virtual object of a viewer at a distribution destination of another information processing apparatus satisfying a predetermined condition related to distance, information received from the other information processing apparatus, as motion information regarding the virtual object of the viewer at the distribution destination of the other information processing apparatus, wherein the received information is smaller in amount than motion information regarding the virtual object of the viewer generated at a distribution destination of the information processing apparatus, and wherein the received information indicates a change in a posture of the virtual object of the viewer at the distribution destination of the other information processing apparatus.

2. The information processing apparatus according to claim 1, wherein the virtual space has multiple areas set up therein, each of the areas having the virtual object of at least one viewer arranged therein, and wherein the circuitry is further configured to arrange the virtual objects of the viewers at all distribution destinations of the information processing apparatus in one area, and arrange the virtual objects of the viewers at all distribution destinations of the other information processing apparatus in another area different from the one area.

3. The information processing apparatus according to claim 2, wherein the one area and the other area are arranged at a predetermined distance from each other in the virtual space.

4. The information processing apparatus according to claim 2, wherein a motion of the virtual object of the viewer arranged in the other area is subjected to simplified display control using the information smaller in amount than the motion information.

5. The information processing apparatus according to claim 4, wherein the information smaller in amount than the motion information includes bone information regarding a viewer avatar as the virtual object of the viewer.

6. The information processing apparatus according to claim 1, wherein the virtual objects of the viewers more numerous than those that a single information processing apparatus is capable of processing are arranged in the virtual space.

7. The information processing apparatus according to claim 1, wherein the circuitry is further configured to perform control to transmit, to the other information processing apparatus, information generated by extracting a portion of the motion information regarding the virtual objects of all of the viewers at the distribution destinations of the information processing apparatus.

8. The information processing apparatus according to claim 7, wherein the information generated by extracting the portion of the motion information is smaller in amount than the motion information.

9. The information processing apparatus according to claim 7, wherein the information generated by extracting the portion of the motion information includes bone information regarding a viewer avatar as the virtual object of the viewer.

10. The information processing apparatus according to claim 1, wherein the circuitry is further configured to perform direction adjustment to orient the virtual object of the performer in the virtual space in a direction in which the virtual object of the viewer at the distribution destination is positioned.

11. The information processing apparatus according to claim 1, wherein the virtual object of the performer includes a live-action 3D model generated based on multiple images captured of the performer simultaneously from multiple directions.

12. An information processing method, implemented via at least one processor, the method comprising:

performing control to distribute, to at least one viewer terminal, information regarding a virtual space in which a virtual object of a performer and a virtual object of a viewer are arranged; and performing control to use, from among a plurality of virtual objects of all viewers arranged in the virtual space, for each virtual object of a viewer at a distribution destination of another information processing apparatus satisfying a predetermined condition related to distance, information received from the other information processing apparatus, as motion information regarding the virtual object of the viewer at the distribution destination of the other information processing apparatus, wherein the received information is smaller in amount than motion information regarding the virtual object of the viewer generated at a distribution destination of the distribution control, and wherein the received information indicates a change in a posture of the virtual object of the viewer at the distribution destination of the other information processing apparatus.

13. A non-transitory computer-readable storage medium having embodied thereon a program, which when executed by a computer of an information processing apparatus causes the computer to execute a method, the method comprising:

performing control to distribute, to at least one viewer terminal, information regarding a virtual space in which a virtual object of a performer and a virtual object of a viewer are arranged; and performing control to use, from among a plurality of virtual objects of all viewers arranged in the virtual space, for each virtual object of a viewer at a distribution destination of another information processing apparatus satisfying a predetermined condition related to distance, information received from the other information processing apparatus, as motion information regarding the virtual object of the viewer at the distribution destination of the other information processing apparatus, wherein the received information is smaller in amount than motion information regarding the virtual object of the viewer generated at a distribution destination of the information processing apparatus, and wherein the received information indicates a change in a posture of the virtual object of the viewer at the distribution destination of the other information processing apparatus.

14. The information processing apparatus according to claim 1, wherein the change in the posture of the virtual object of the viewer at the distribution destination of the other information processing apparatus is reflected based on bone information.

\* \* \* \* \*